(12) United States Patent
Herber et al.

(10) Patent No.: US 11,074,929 B1
(45) Date of Patent: Jul. 27, 2021

(54) ENERGY-ASSISTED MAGNETIC RECORDING HEAD WITH PROTECTIVE CAP

(71) Applicant: Western Digital Technologies, Inc., San Jose, CA (US)

(72) Inventors: John Pierre Herber, San Jose, CA (US); Mark David Alnas Alias, Los Banos (PH); Aileen Ticzon Jara, Santa Rosa (PH); Reimar Azupardo, Santo Tomas Batangas (PH)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/920,093

(22) Filed: Jul. 2, 2020

Related U.S. Application Data

(60) Provisional application No. 63/045,768, filed on Jun. 29, 2020.

(51) Int. Cl.
| | |
|---|---|
| *G11B 5/255* | (2006.01) |
| *G11B 5/235* | (2006.01) |
| *G11B 5/127* | (2006.01) |
| *G11B 5/31* | (2006.01) |
| *G11B 5/40* | (2006.01) |
| *G11B 5/39* | (2006.01) |
| *G11B 5/60* | (2006.01) |
| *G11B 5/00* | (2006.01) |

(52) U.S. Cl.
CPC ............ *G11B 5/255* (2013.01); *G11B 5/1278* (2013.01); *G11B 5/235* (2013.01); *G11B 5/314* (2013.01); *G11B 5/3146* (2013.01); *G11B 5/3912* (2013.01); *G11B 5/3967* (2013.01); *G11B 5/40* (2013.01); *G11B 5/607* (2013.01); *G11B 2005/0018* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 6,433,965 B1 * | 8/2002 | Gopinathan et al. | ....................... G11B 5/6005 360/235.4 |
| 8,134,794 B1 | 3/2012 | Wang | |

(Continued)

*Primary Examiner* — Craig A. Renner
(74) *Attorney, Agent, or Firm* — Loza & Loza, LLP; Gabriel Fitch

(57) ABSTRACT

Aspects of the present disclosure provide various magnetic recording slider structures and fabrication methods that can reduce head overcoat (HOC) thickness without significantly reducing the lifetime and reliability of a slider by using a protective cap placed on preselected locations on the outermost surface or HOC of the slider. A slider includes a writer comprising an energy-assisted recording element. The writer is configured to store information on a magnetic medium using the energy-assisted recording element. The slider includes a head overcoat (HOC) layer providing an outermost media facing surface. The slider further includes a protective cap positioned on the HOC layer to at least partially cover the energy-assisted recording element, the protective cap including a preselected shape configured to protect the energy-assisted recording element.

18 Claims, 8 Drawing Sheets

(56) References Cited

U.S. PATENT DOCUMENTS

| | | | |
|---|---|---|---|
| 8,902,720 B1 | 12/2014 | Schreck et al. | |
| 9,036,307 B1 * | 5/2015 | Hoshiya et al. | G11B 5/3106 360/59 |
| 9,093,102 B1 | 7/2015 | Gong et al. | |
| 9,099,113 B1 | 8/2015 | Futumoto et al. | |
| 9,437,222 B1 | 9/2016 | Okamura et al. | |
| 9,449,631 B2 | 9/2016 | Gong et al. | |
| 10,083,713 B1 * | 9/2018 | Simmons et al. | G11B 5/3106 |
| 10,482,907 B1 | 11/2019 | Mani Biswas et al. | |
| 10,672,419 B1 | 6/2020 | Matsumoto et al. | |
| 2004/0052004 A1 * | 3/2004 | Nakayama | G11B 5/3106 360/313 |
| 2005/0068691 A1 * | 3/2005 | Kagami et al. | G11B 5/3906 360/324.2 |
| 2006/0077593 A1 * | 4/2006 | Ueda | G11B 5/40 360/235.1 |
| 2008/0204938 A1 * | 8/2008 | Hirata et al. | G11B 5/3106 360/245.3 |
| 2009/0052093 A1 * | 2/2009 | Kawakita et al. | G11B 5/3106 360/314 |
| 2013/0229895 A1 * | 9/2013 | Shiroishi et al. | G11B 5/3146 369/13.14 |
| 2013/0279039 A1 * | 10/2013 | Shiroishi | G11B 5/607 360/48 |
| 2014/0241138 A1 * | 8/2014 | Hirata et al. | G11B 5/3133 360/59 |
| 2015/0063086 A1 * | 3/2015 | Wierman | G11B 5/3106 360/235.4 |
| 2016/0163339 A1 * | 6/2016 | Kodama et al. | G11B 5/255 360/235.4 |
| 2016/0372140 A1 * | 12/2016 | Bian et al. | G11B 5/3106 |
| 2019/0244635 A1 | 8/2019 | Goncharov et al. | |
| 2020/0090683 A1 * | 3/2020 | Tomoda et al. | G11B 5/6082 |

\* cited by examiner

ENERGY-ASSISTED MAGNETIC RECORDING HEAD WITH PROTECTIVE CAP

CROSS-REFERENCE TO RELATED APPLICATIONS

This application claims priority to and the benefit of U.S. Provisional Patent Application No. 63/045,768, filed on Jun. 29, 2020 entitled, "ENERGY-ASSISTED MAGNETIC RECORDING HEAD WITH PROTECTIVE CAP," the entire content of which is incorporated herein by reference.

INTRODUCTION

The present disclosure relates to an energy-assisted slider for magnetic recording, a method for fabricating the energy-assisted slider, and a data storage apparatus using the energy-assisted magnetic slider for magnetic recording.

Magnetic storage systems, such as a hard disk drive (HDD), are utilized in a wide variety of devices in both stationary and mobile computing environments. Examples of devices that incorporate magnetic storage systems include data center storage systems, desktop computers, portable notebook computers, portable hard disk drives, network storage systems, high definition television (HDTV) receivers, vehicle control systems, cellular or mobile telephones, television set top boxes, digital cameras, digital video cameras, video game consoles, and portable media players.

A typical HDD includes magnetic storage media in the form of one or more flat disks or platters. The disks are generally formed of two main substances, namely, a substrate material that gives it structure and rigidity, and a magnetic media coating that holds the magnetic impulses or moments that represent data in a recording layer within the coating. The typical HDD also includes a magnetic recording head or slider including a read head and a write head, which can sense and/or change the magnetic fields stored on the recording layer of the disks. Energy-assisted magnetic recording techniques have been used to increase the areal density (AD) of written data on a magnetic storage medium having high coercivity. Examples of energy-assisted magnetic recording are heat assisted magnetic recording (HAMR) and microwave assisted magnetic recording (MAMR). A media facing surface or air bearing surface of the magnetic recording head is protected by a protection film such as a head overcoat (HOC). Reducing the thickness of the HOC can improve the magnetic spacing and performance of the device, but can also reduce the reliability and lifetime of the magnetic recording head or slider.

SUMMARY

One embodiment of the present disclosure provides a slider configured for energy-assisted magnetic recording. The slider includes a writer comprising an energy-assisted recording element. The writer is configured to store information on a magnetic medium using the energy-assisted recording element. The slider further includes a head overcoat (HOC) layer providing an outermost media facing surface. The slider further includes a protective cap positioned on the HOC layer to at least partially cover the energy-assisted recording element, the protective cap including a preselected shape configured to protect the energy-assisted recording element.

Another embodiment of the present disclosure provides a data storage device that includes a magnetic medium and a slider described in this disclosure configured to store data using the magnetic medium.

Another embodiment of the present disclosure provides a method for fabricating a slider configured for energy-assisted magnetic recording. The method provides a writer comprising an energy-assisted recording element. The writer is configured to store information on a magnetic medium using the energy-assisted recording element. The method further provides a head overcoat (HOC) layer on an outermost media facing surface of the slider. The method further provides a protective cap on the HOC layer to at least partially cover the energy-assisted recording element.

Another embodiment of the present disclosure provides a slider configured for energy-assisted magnetic recording. The slider includes a writer comprising an energy-assisted recording element. The writer is configured to store information on a magnetic medium using the energy-assisted recording element. The slider further includes a reader configured to read information stored on the magnetic medium. The slider further includes a head overcoat (HOC) layer providing an outermost media facing surface. The slider further includes a protective cap positioned on the HOC layer to at least partially cover the reader. The protective cap may include diamond like carbon (DLC).

DETAILED DESCRIPTION

There is an ever-increasing demand for storing more data in a data storage device (e.g., hard disk drive (HDD)). Various technical approaches have been used to increase the HDD's data capacity by increasing the recording density of the HDD. For example, energy-assisted magnetic recording (EAMR) techniques have been used to increase the data aerial density on a magnetic recording medium in the HDD. Examples of EAMR techniques are heat-assisted magnetic recording (HAMR) and microwave-assisted magnetic recording (MAMR). In MAMR, a magnetic recording head or slider may apply microwave energy to locally excite the magnetic recording medium to reduce the magnetization-reversing magnetic field. In one example, the slider may have a spin-torque oscillator (STO) that can cause a magnetic resonance across a target region on the magnetic recording medium. This in turn causes the magnetization to fluctuate and the magnetization-inverted magnetic field to drop.

The media facing surface or air bearing surface (ABS) of a slider is often protected by a protection film, for example, a head overcoat (HOC). Reducing the thickness of the HOC can improve the magnetic spacing and device performance of the slider. However, reducing the HOC thickness can also negatively impact (e.g., reduce) the lifetime and reliability of the slider. Therefore, reducing the thickness of the HOC while maintaining or increasing slider performance can present conflicting goals in the design of a slider. For example, while reducing the HOC thickness can improve the magnetic spacing and performance of the slider, the slider or its components (e.g., STO and reader) may have a shorter lifetime due to increased oxidation caused at least in part by the thinner HOC.

Aspects of the present disclosure provide various magnetic recording slider structures and fabrication methods that can reduce HOC thickness without significantly reducing the lifetime and reliability of a slider by using a protective cap placed on preselected locations on the outermost surface or HOC of the slider. In one aspect, the protective cap can increase the thickness of the HOC at the preselected locations, or provide a barrier, to reduce the probability of oxygen migration (e.g., that may result in oxidation) through the HOC, or other layers beneath the HOC, to protect preselected components of the slider.

Figure 1:
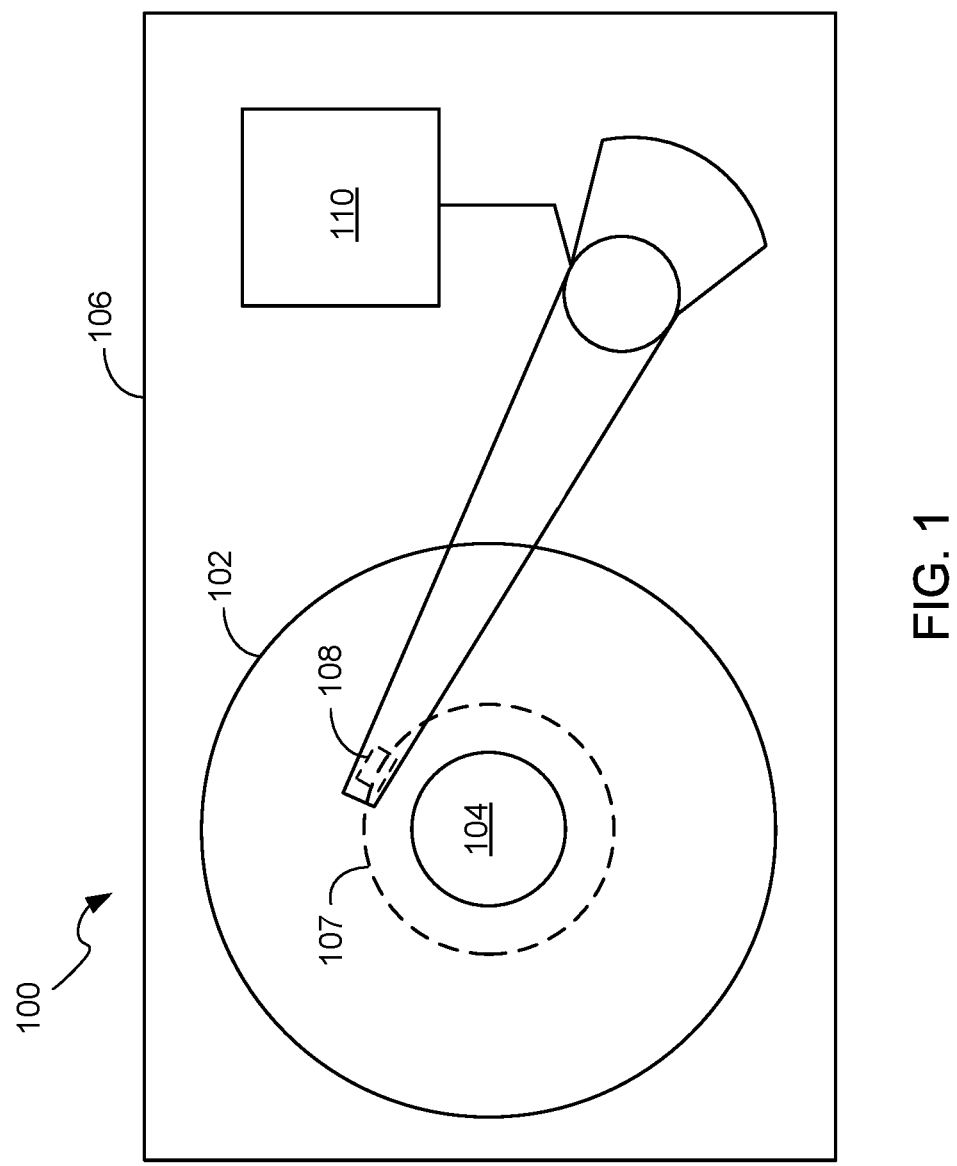
FIG. 1 is a top schematic view of a data storage device configured for energy-assisted magnetic recording (EAMR) in accordance with one embodiment.

FIG. 1 is a top schematic view of a data storage device (e.g., hard disk drive (HDD)) 100 configured for EAMR including a magnetic medium 102 and a slider 108 in accordance with one embodiment. The data storage device 100 may include one or more magnetic disks/media 102 to store data. The disk/media 102 resides on a spindle assembly 104 that is mounted to a drive housing. Data may be stored along tracks in the magnetic recording layer of the disk 102. The reading and writing of data is accomplished with the slider 108 (magnetic recording head) that may have both read and write elements (e.g., read head 202 and write head 204 shown in FIG. 2). The write head 204 (writer) is used to alter the properties of the magnetic recording layer of disk 102 and thereby write information thereto. In one embodiment, slider 108 may have magneto-resistive (MR) or giant magneto-resistive (GMR) elements. In an alternative embodiment, the slider 108 may be another type of magnetic recording head, for example, an inductive read/write head or a Hall effect head. In operation, a spindle motor (not shown) rotates the spindle assembly 104, and thereby rotates the disk 102 to position the slider 108 at a particular location along a desired disk track 107. The position of the slider 108 relative to the disk 102 may be controlled by the control circuitry 110 (e.g., a microcontroller).

Figure 2:
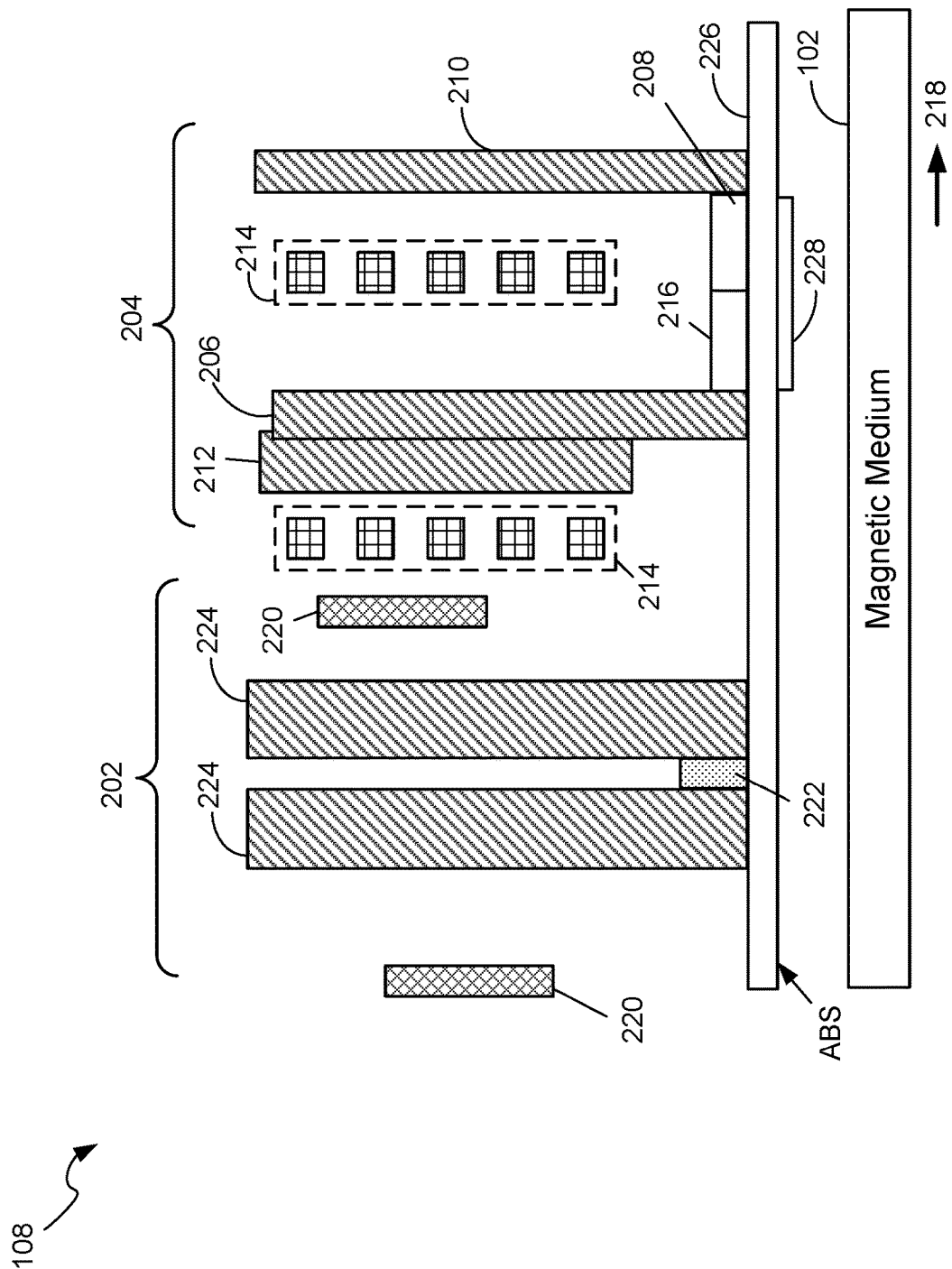
FIG. 2 is a schematic sectional view of a slider and a magnetic medium in accordance with one embodiment.

FIG. 2 is a schematic sectional view of a portion of the slider 108 and the magnetic medium 102 of FIG. 1 according to one embodiment. As shown, the slider 108 has a read head 202 (e.g., reader) and a write head 204 (e.g., writer). The read head 202 has a read element 222 between read shields 224. The write head 204 has a main pole 206, a trailing shield 208, a sub-pole 210, an auxiliary magnetic pole 212, and a coil 214. An energy-assisted recording element or structure 216 is provided between the main pole 206 and the trailing shield 208. In one embodiment, the energy-assisted recording element 216 may include a spin torque oscillator (STO). In other embodiments, the energy-assisted recording element 216 may include a multi-layer structure including magnetic and non-magnetic materials, or a structure including non-magnetic electrically conductive material, each configured to provide assistive effect for the write operation. Examples of such a structure include those described in U.S. Pat. No. 10,366,714, titled "Magnetic write head for providing spin-torque-assisted write field enhancement," to Olson et al. and in U.S. Pat. No. 10,679,650, titled "Current-assisted magnetic recording write head with improved write gap structure" to Bai et al., both of which are assigned to assignee of the current application and hereby incorporated by reference. The arrow 218 in FIG. 2 indicates the motion of the magnetic medium 102 relative to the slider 108. The slider may include one or more heating elements 220 for thermal fly-height control (TFC). TFC can improve the flying characteristics of the read/write element to provide a consistent magnetic spacing between the slider 108 and the magnetic medium 102.

The exterior surface of the slider 108 is protected by a head overcoat (HOC) 226 that forms an air bearing surface (ABS). The ABS is the outermost media facing surface of the slider. Only some components of the slider 108 are shown in FIG. 2 for describing various aspects of the slider. The HOC 226 is a protective film that covers substantially the entire ABS of the slider. In one example, the HOC 226 may be a bi-layer composed of a silicon nitride seed layer and a carbon layer overcoat to provide wear protection to the ABS. While the thickness of the HOC 226 can be reduced to improve the magnetic spacing and device performance of the slider, the slider (e.g., read head and/or write head) will have reduced lifetime and reliability. In some aspects of the disclosure, a protective cap 228 may be formed (e.g., using preselected shapes) at a specific location on the HOC to protect the desired features or components of the slider 108. In some embodiments, multiple protective caps may be formed on the HOC to protect multiple features of the slider. In one embodiment, the protective cap 228 may be a carbon cap (e.g., a cap made of carbon such as diamond like carbon (DLC)) with a thickness between about 2 Angstrom (Å) and about 6 Å. The protective cap 228 may have various geometric shapes, for example, circular, oval, rectangular, square, polygonal, etc.

The protective cap 228 may cover any area on the HOC 226 corresponding to any desired structure (e.g., STO, read head, etc.) that needs additional protection, for example, from corrosion. In one aspect, a suitable location of the protective cap 228 is chosen such that the cap does not significantly affect the thermal fly-height control or touchdown power of the slider.

Thermal flying-height control (TFC) techniques can be applied to produce a protrusion on the air bearing surface, effectively reducing the magnetic spacing. For example, a TFC heater (e.g., heating elements 220) can be disposed in a slider to control or calibrate a controllable protrusion near the reader and/or writer through thermal expansion, which lowers the fly-height for the reader and/or writer. The magnetic spacing of the reader and/or writer can be controlled or calibrated by adjusting the power applied to the TFC heater. Touchdown power refers to the power applied to the TFC heater when the designed protrusion of the head structure touches the recording medium surface. The relationship between the applied TFC power and the corresponding protrusion can be calibrated, enabling precise magnetic spacing of both the reader and writer to optimize their performance, while balancing the spacing requirements to manage the reliability of the interface.

Figure 3:
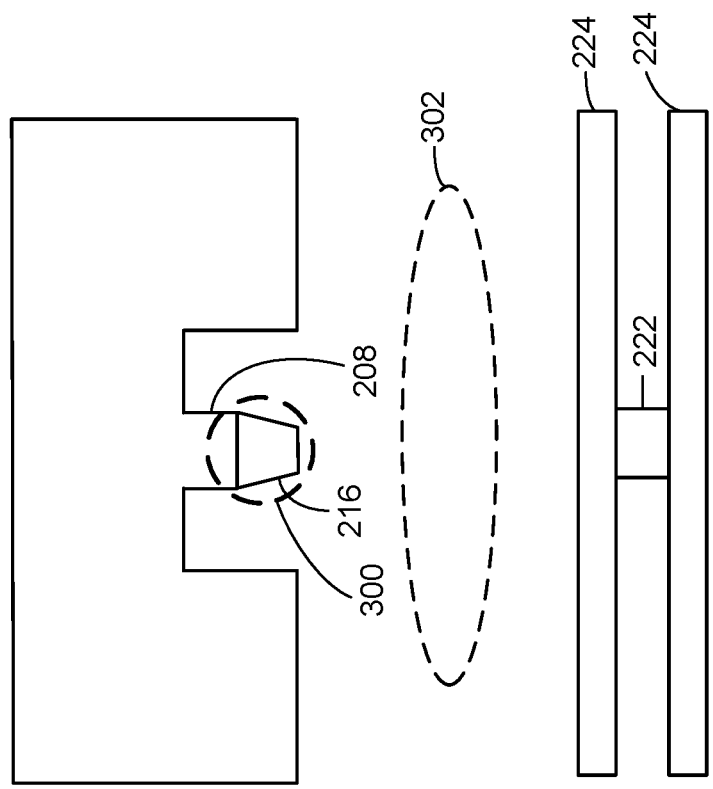
FIG. 3 is a schematic drawing illustrating an air bearing surface (ABS) of the slider and a location of a protective cap on the ABS in accordance with one embodiment.

FIG. 3 is a schematic drawing illustrating an ABS of the slider 108 according to one embodiment. Only some exemplary components of the slider are shown in FIG. 3. An area 300 of the ABS can be covered by the protective cap 228 on the HOC 226 as illustrated in FIG. 2. Only some exemplary features of the slider 108 are shown in FIG. 3. In this example, the protected area 300 may cover some or all of the energy-assisted recording element 216 and/or trailing shield 208 of the write head 204. In one embodiment, the energy-assisted recording element 216 may include an STO that can assist in writing data to the magnetic medium 102 using MAMR techniques. In one example, the protective cap 228 may cover the area 300 that is centered on the energy-assisted recording element 216. In one example, the protective cap 228 may cover the area 300 that is offset from the center of the energy-assisted recording element 216. In some embodiments, the protective cap 228 may cover about 25 percent, about 50 percent, or about 75 percent or more of the energy-assisted recording element 216. In some examples, the area 300 may be 5 µm in diameter or smaller. In one example, the protective cap 228 may cover the area 300 corresponding to the energy-assisted recording element 216, but not including the trailing shield 208. In one embodiment, the protective cap 228 may cover the area 300 that is away from a protrusion area 302 created by a TFC heating element (e.g., heating element 220 shown in FIG. 2) such that the TFC touchdown power of the slider is not significantly affected by the presence of the protective cap 228. In one embodiment, the protective cap 228 does not cover the reader of the slider. In some aspects, a predetermined offset can be applied to the TFC touchdown power to account for the effect of the protective cap during the touchdown event (e.g., when the slider/protrusion makes contact with the media). For example, the predetermined offset can increase or decrease the TFC touchdown power to adjust the thermal fly-height of the slider to account for the effect of the protective cap on the touchdown event. In one aspect, the protective cap has no effect on the touchdown event or touchdown power.

The above described locations, shapes, and material of the protective cap 228 are only illustrative in nature and not limiting. In some aspects of the disclosures, the protective cap 228 may include a single cap or multiple caps. A protective cap can cover any area or multiple areas on the HOC 226 to provide additional protection (e.g., corrosion protection) to selected slider features or structures (e.g., reader, writer, STO, etc.). A protective cap can be located on an area of the HOC to reduce or minimize the effect on the TFC touchdown power of the slider. For example, the protective cap can be located away from the TFC protrusion.

Figure 4:
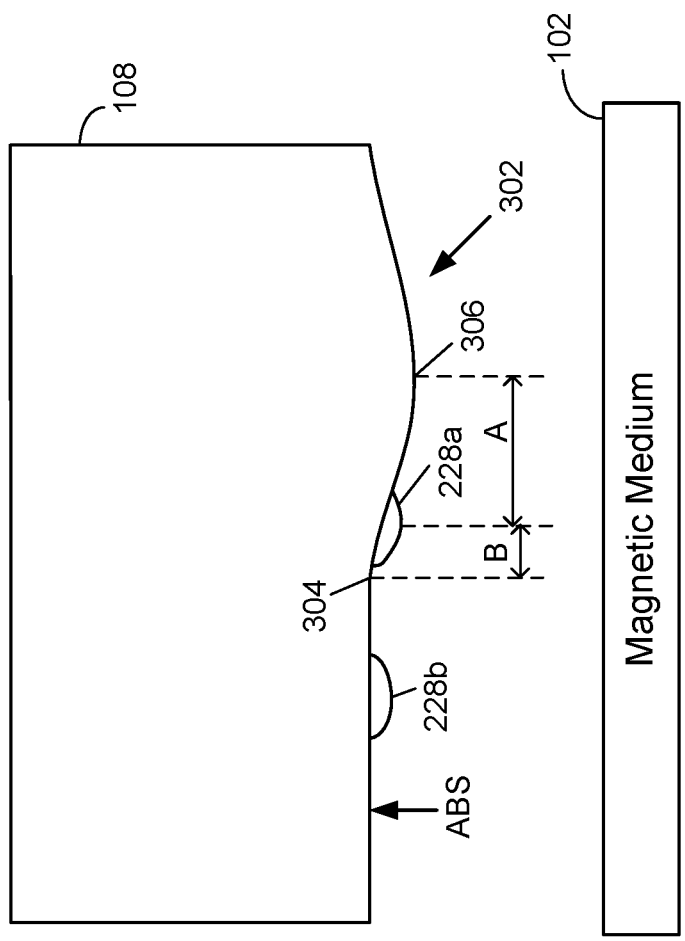
FIG. 4 is a schematic drawing illustrating a side view of the slider with exemplary protective caps on the ABS in accordance with one embodiment.

FIG. 4 is a schematic drawing illustrating a side view of the slider 108 and exemplary protective caps 228a and 228b on the ABS. In the illustrated embodiment, the protective cap 228b may be located at a position away from a protrusion area 302 (e.g., a position at least partially covering the reader). In one embodiment, a distance A between the protective cap 228a and the highest point 306 of the protrusion 302, relative to the magnetic medium 102, is greater than a distance B between the protective cap 228a and the lowest point 304 of the protrusion. The highest point 306 of the TFC protrusion area will be closer to a recording medium (magnetic medium 102) than the lowest point 304, and may also be the point/location of the slider 108 that is closest to the media when the heater is activated. In some examples, the protective cap 228b may be located in an area (e.g., a substantially flat area) of the ABS that is outside of the protrusion area 302. In one aspect, the cap 228a can be positioned sufficiently away from the protrusion point 306 such that the highest point of the cap, relative to the slider 108, is not higher than the protrusion point 306. In such case, the protrusion point 306 would be the point of contact, or center of an area of contact, during media touchdown rather than the protective cap 228a.

Figure 5:
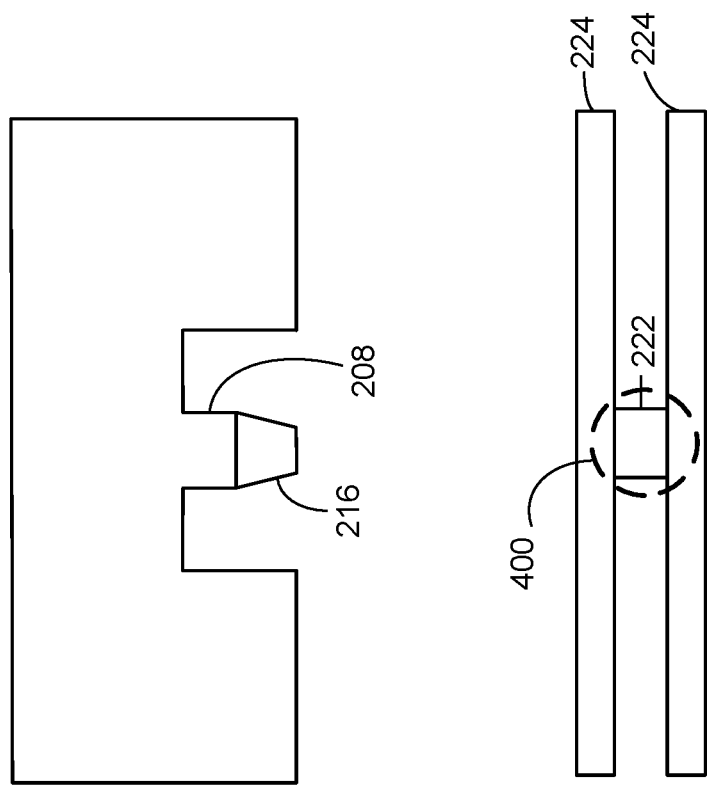
FIG. 5 is a schematic drawing illustrating an ABS of the slider and a location of a protective cap in accordance with one embodiment.

FIG. 5 is a schematic drawing illustrating an ABS of the slider 108 according to one embodiment. Only some exemplary components of the slider are shown in FIG. 5. A protective cap (e.g., protective cap 228) can cover an area 400 near a read head. In some examples, the area 400 may cover some or all of the read element 222 and/or read shields 224 of the read head 202. In one example, the area 400 may be centered on the read element 222. In one example, the area 400 may be offset from the center of the read element 222. In one example, the area 400 may cover one or both read shields.

Figure 6:
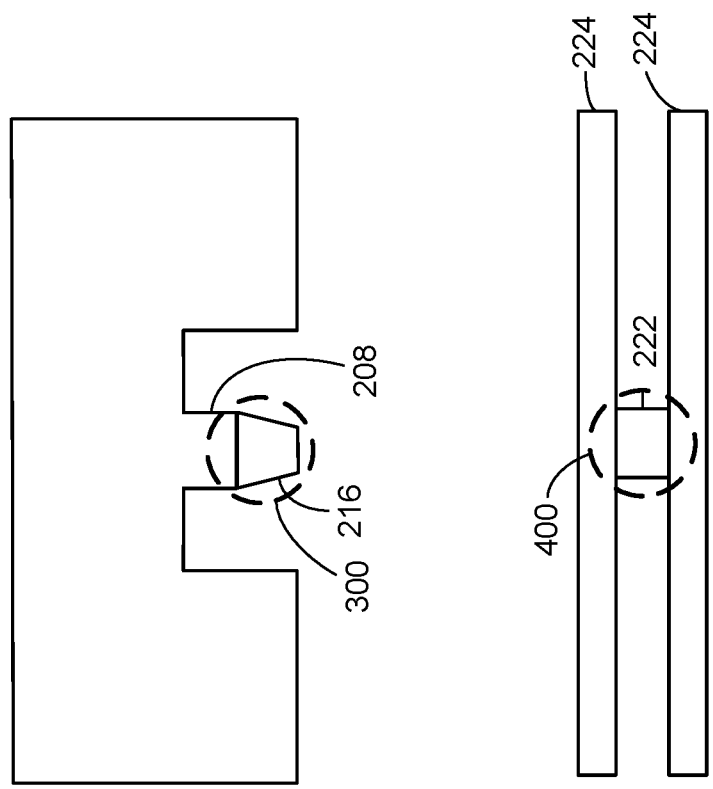
FIG. 6 is a schematic drawing illustrating an ABS of the slider and locations of protective caps in accordance with one embodiment.

FIG. 6 is a schematic drawing illustrating an ABS of the slider 108 according to one embodiment. Only some exemplary components of the slider are shown in FIG. 6. In this example, two separate areas (e.g., areas 300 and 400) of the ABS can be covered by protective caps (e.g., protective caps 228). In one embodiment, the protective caps may cover some or all of the energy-assisted recording element 216, trailing shield 208 of the write head 204, read element 222, and/or read shields 224. The independent protective caps covering the areas 300 and 400 may be different in shape, size, and/or geometry. While the protected areas illustrated in FIGS. 3, 5, and 6 are circular in shape, other geometric shapes and sizes are also contemplated in this disclosure. In various embodiments, the protective cap 228 may have any suitable shape, thickness, and size to cover an area on the HOC/ABS in order to provide further protection to a predetermined feature (e.g., energy-assisted recording element 216) of the slider 108. In some examples, the protective caps on the areas 300 and 400 may be different in thickness, shapes, and/or sizes. In one aspect, protective caps 228 covering areas 300 and 400 may be fabricated at the same time, have the same height, and be made of the same materials, while having individual placement and individual or the same geometry.

Figure 7:
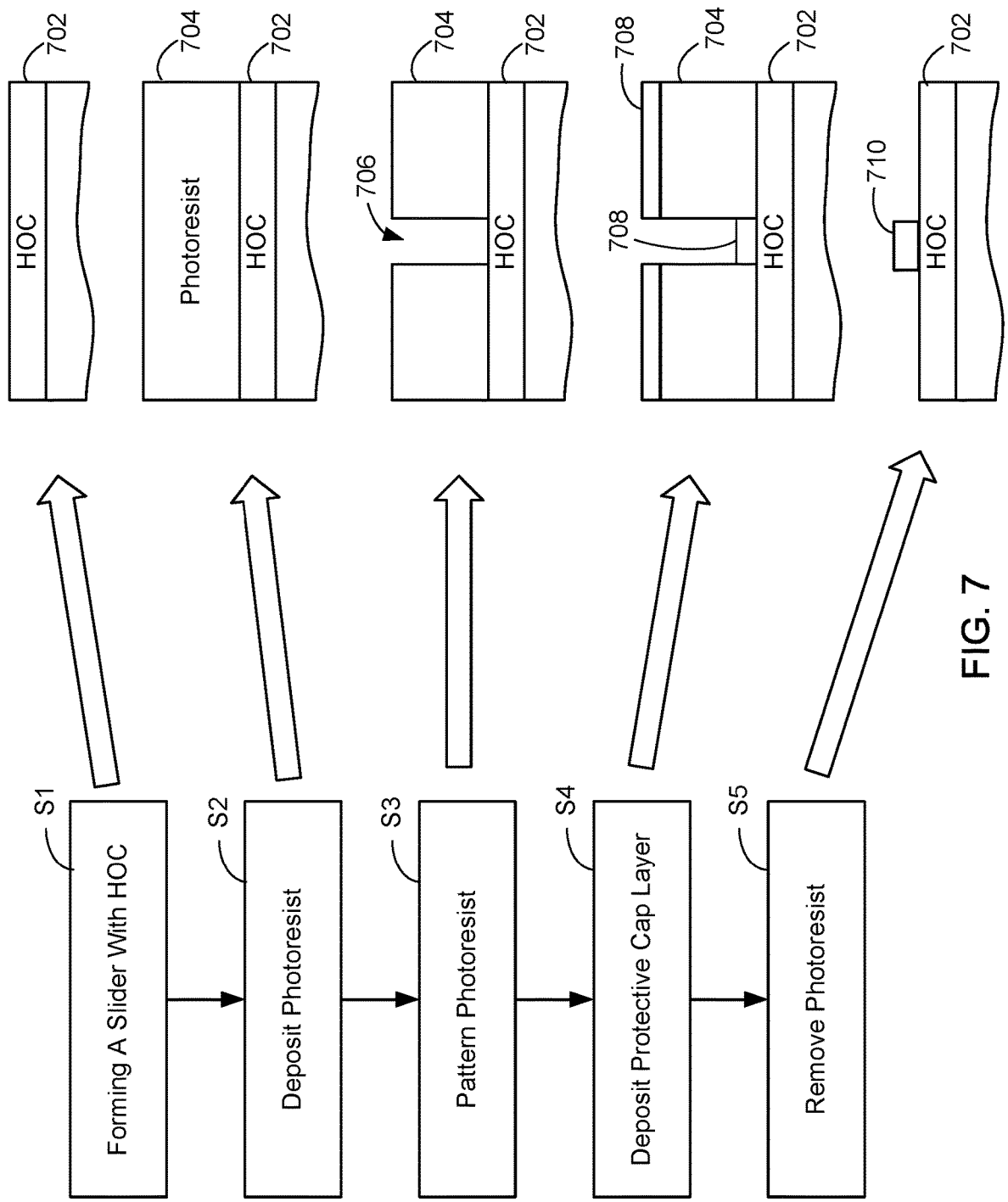
FIG. 7 is a flowchart illustrating a method for fabricating a slider with a protective cap on a head overcoat (HOC) using an additive patterning process in accordance with one embodiment.

FIG. 7 is a flowchart illustrating a method for fabricating a slider with a protective cap on the HOC using an additive patterning process in accordance with one embodiment. The method can be used to fabricate any of the sliders described above in relation to FIGS. 2-6 or any hard disk drive slider with a protective cap. This method can be applied at the rowbar level. During fabrication, a plurality of sliders are formed on a wafer that is sliced into a number of rowbars each including a row of sliders that can be further processed, for example, adding the protective cap. For a rowbar, the locations of each pole tip relative to the next one is well defined. During the fabrication of the protective cap, multiple row bars can be loaded into a photolithography tool and efficiently processed once the array is geometrically defined. Photolithography can be done on groups of sliders at the rowbar level, rather than one by one. Fabricating protective caps on individual sliders could also be done but might be more time consuming and less efficient. Thus, fabricating the protective cap at the rowbar level provides the flexibility to place the protective cap on any desired slider component on the ABS and batch process multiple sliders. The protective cap can have any desired shape and size to cover, or partially cover, the desired component on the ABS side of a slider.

In a process 51, a slider (e.g., slider 108) is formed with a head overcoat (HOC) on an air bearing surface (ABS). A portion of the slider with the ABS facing upward is shown in FIG. 7. In one example, the HOC 702 may be made of silicon nitride seeds and a carbon overcoat. In one embodiment, the HOC may have a thickness of about 11 Å or any suitable thickness. In a process S2, a photoresist 704 is deposited on the HOC 702. The photoresist 704 may be made of a light sensitive material that covers substantially the entire ABS, including areas corresponding to various slider components, for example, the read head 202, write head 204, energy-assisted recording element 216, trailing shield 208, etc. In a process S3, the photoresist 704 is patterned to expose one or more areas 706 of the HOC. For example, the photoresist 704 may be exposed to UV light using a mask (not shown) that has an opening corresponding to the area 706. Then, the UV exposed portions of the photoresist 704 are removed to expose the area 706 on the HOC.

In a process S4, a protective cap layer 708 is deposited on the patterned photoresist 704 and HOC 702. In one embodiment, the protective cap layer 708 may be a carbon layer (e.g., diamond-like carbon layer). The protective cap layer 708 may be deposited using a vapor deposition process. In one embodiment, the thickness of the protective cap layer 708 may be between about 2 Å and about 6 Å. After the deposition, the exposed area 706 of the HOC is covered by the protective cap layer 708, for example, a carbon layer. In a process S5, the photoresist is removed, leaving a protective cap 710 (e.g., carbon cap) on the HOC 702. A thickness of the protective cap 710 may be smaller than the thickness of the HOC 702.

In some embodiments, the protective cap layer 708 may be fabricated with various forms of carbon structures, for example, from graphite to diamond like carbon (DLC) structures. In some embodiments, the protective cap layer 708 may include various dopants to modify the protective cap layer's characteristics, for example, mechanical, electrical, chemical, tribological, and/or thermal characteristics. Exemplary dopants include Si, Zr, Ti, B, and $N_2$. The properties of the protective cap layer can depend on the thickness of the film deposited. For example, the sp3/sp2 bonding states of the carbon structure can vary depending on the carbon film thickness, and as such can vary the carbon film properties. The sp3/sp2 bonding states and the desired height of the protective cap above the base film (e.g., HOC 702) can be considered together when choosing the thickness of the protective cap. In one embodiment, a part (e.g. area 706) of the base film (e.g., HOC 702) can be etched away. Then, the protective cap layer 708 can be deposited on the etched portion of the base film. This fabrication method may result in a thicker protective cap layer deposition, as compared to methods that do not use etching, that can provide a larger range of sp3/sp2 bonding states while maintaining a cap height range of about 2 Å to 6 A above the HOC.

Figure 8:
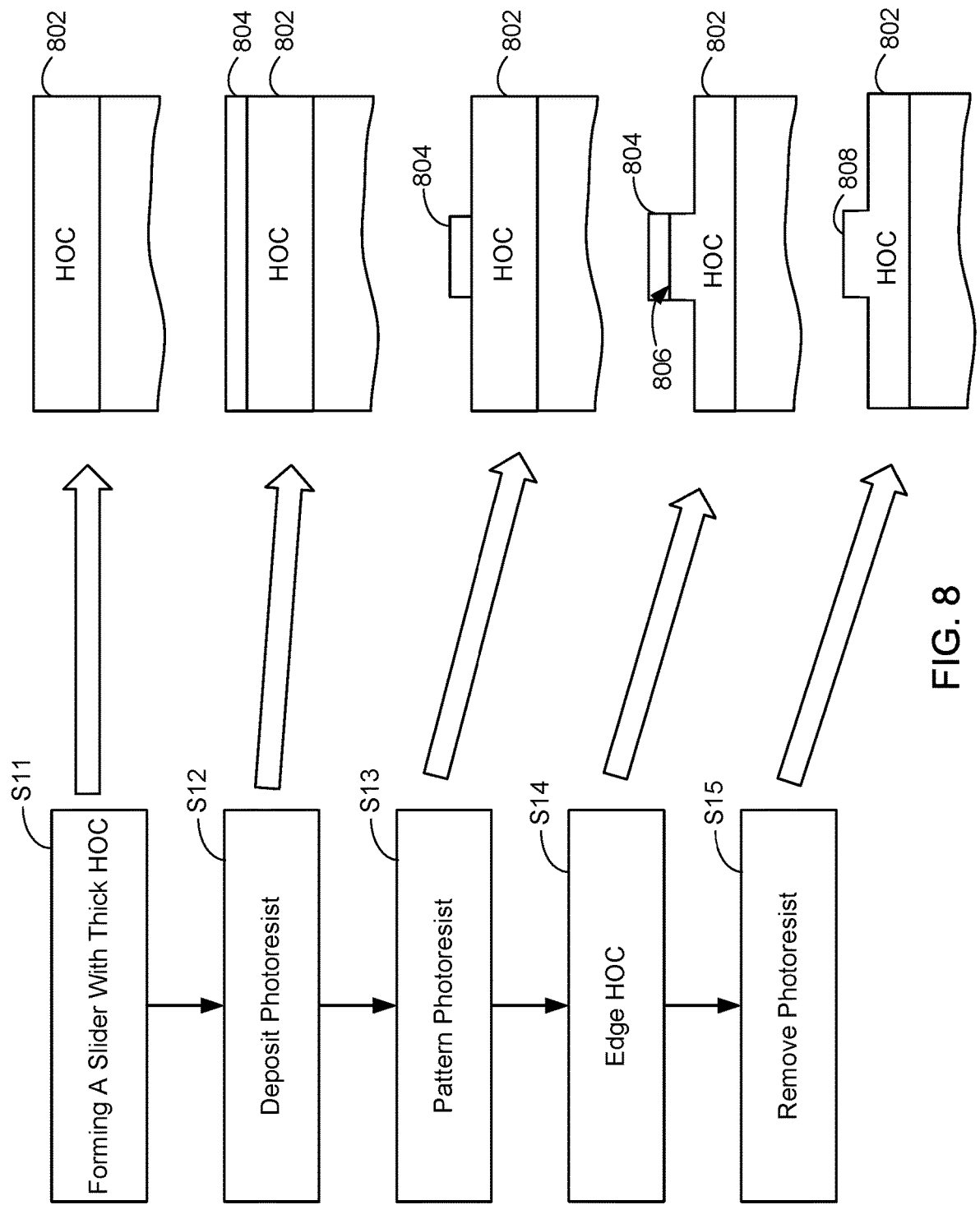
FIG. 8 is a flowchart illustrating a method for fabricating a slider with a protective cap on a HOC using a subtractive patterning process in accordance with one embodiment.

FIG. 8 is a flowchart illustrating a method for fabricating a slider with a protective cap on the HOC using a subtractive patterning process in accordance with one embodiment. The method can be used to fabricate any of the sliders described above in relation to FIGS. 2-6 or any hard disk drive slider with a protective cap. In a process S11, a slider (e.g., slider 108) is formed with a HOC 802 on an ABS. A portion of the slider with the ABS facing upward is shown in FIG. 8. In one example, the HOC 802 may be made of silicon nitride seeds and a carbon overcoat. In one embodiment, the HOC 802 may have a thickness of about 13 Å or any suitable thickness. In a process S12, a photoresist 804 is deposited on the HOC 802. The photoresist 804 may be made of a light sensitive material that covers substantially the entire ABS including areas corresponding to various slider components, for example, the read head 202, write head 204, trailing shield 208, energy-assisted recording element 216, etc.

In a process S13, the photoresist 804 is patterned to expose the HOC 802 except an area corresponding to a protective cap that will be formed in the subsequent processes. In a process S14, the HOC 802 is etched, for example, using ion beam etching or any suitable etching processes. The patterned photoresist 804 protects an area 806 of the HOC 802 during etching. In one example, the protected area 806 may correspond in location to the energy-assisted recording element 216 (e.g., STO) or any desired slider structures (e.g., read head, trailing shield). In a process S15, the photoresist is removed, forming a protective cap 808 on the HOC 802. In one embodiment, a thickness of the protective cap 808 may between about 2 Å and 6 Å.

The above-described protective cap and processes for forming the protective cap can improve the lifetime of an EAMR slider without significantly affecting the magnetic performance of the slider. The protective cap can protect various slider components, for example, reader, writer, and STO, etc. Test results showed an STO covered by the protective cap has more than twice the lifetime compared to an STO of a slider without the protective cap. At the same time, test results showed that a slider with the protective cap exhibits minimal or insignificant penalties in magnetic performance as compared to sliders without the protective cap. Test results also showed that adding the protective cap to a slider does not significantly change the TFC touchdown power, compared to comparative sliders without the protective cap.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

In one embodiment, the process can perform the sequence of actions in a different order. In another embodiment, the process can skip one or more of the actions. In other embodiments, one or more of the actions are performed simultaneously. In some embodiments, additional actions can be performed.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be formed by an apparatus controlled by hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable or machine readable medium having stored thereon computer executable instructions that when executed by a computer (e.g., a processor) control the computer to perform the functionality described herein. Examples of machine readable media suitable for implementing the subject matter described herein include non-transitory computer-readable media, such as disk memory devices, chip memory devices, programmable logic devices, and application specific integrated circuits. In addition, a machine readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

Certain components (including layers, coatings, or other components) listed herein may be described as "comprising," "made of," "including," or similar such terms, a material or a combination of materials. In one aspect, each of those components may also consist of that material or the combination of materials. In another aspect, each of those components may also consist essentially of that material or the combination of materials.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

If used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC) Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A slider configured for energy-assisted magnetic recording, the slider comprising:
   a writer comprising an energy-assisted recording element, the writer configured to store information on a magnetic medium using the energy-assisted recording element, wherein the energy-assisted recording element comprises a spin torque oscillator (STO);
   a head overcoat (HOC) layer providing an outermost media facing surface; and
   a protective cap positioned on the HOC layer to at least partially cover the energy-assisted recording element, the protective cap comprising a preselected shape configured to protect the energy-assisted recording element, wherein the protective cap covers an area smaller than an area of the outermost media facing surface.

2. The slider of claim 1, wherein the protective cap at least partially covers a shield of the writer.

3. The slider of claim 1, further comprising:
   a reader configured to read information stored on the magnetic medium; and
   wherein the protective cap comprises a first protective cap and a second protective cap spaced apart from the first protective cap, the first protective cap at least partially covering the energy-assisted recording element, and the second protective cap at least partially covering the reader.

4. The slider of claim 1, wherein the protective cap comprises carbon.

5. The slider of claim 1, wherein the protective cap comprises a shape selected from the group consisting of a circular shape, a rectangular shape, a square shape, a polygonal shape, and combinations thereof.

6. The slider of claim 1, wherein a distance between the protective cap and a highest point of a thermal fly-height control (TFC) protrusion area is greater than a distance between the protective cap and a lowest point of the TFC protrusion area.

7. The slider of claim 1, wherein the protective cap is positioned in a first area of the HOC layer spaced apart from a second area of the HOC layer, the second area comprising a controllable protrusion used to calibrate a thermal fly-height of the slider.

8. A data storage device comprising:
   a magnetic medium; and
   the slider of claim 1 configured to store data using the magnetic medium.

9. A method for fabricating a slider configured for energy-assisted magnetic recording, the method comprising:
   providing a writer comprising an energy-assisted recording element, the writer configured to store information on a magnetic medium using the energy-assisted recording element, wherein the energy-assisted recording element comprises a spin torque oscillator (STO);
   providing a head overcoat (HOC) layer on an outermost media facing surface of the slider; and
   providing a protective cap on the HOC layer to at least partially cover the energy-assisted recording element, wherein the protective cap covers an area smaller than an area of the outermost media facing surface.

10. The method of claim 9, wherein the protective cap at least partially covers a shield of the writer.

11. The method of claim 9, wherein the providing the protective cap comprises:
    providing a first protective cap that at least partially covers the energy-assisted recording element; and
    providing a second protective cap that at least partially covers a reader of the slider.

12. The method of claim 9, wherein the protective cap comprises carbon.

13. The method of claim 9, wherein the protective cap comprises a shape selected from the group consisting of a circular shape, a rectangular shape, a square shape, a polygonal shape, and combinations thereof.

14. The method of claim 9, wherein a distance between the protective cap and a highest point of a thermal fly-height control (TFC) protrusion area is greater than a distance between the protective cap and a lowest point of the TFC protrusion area.

15. The method of claim 9, wherein the providing the protective cap comprises:
    providing the protective cap on a first area of the HOC layer spaced apart from a second area of the HOC layer, the second area comprising a controllable protrusion used to calibrate a thermal fly-height of the slider.

16. The method of claim 9, wherein the providing the protective cap comprising:
    forming the protective cap using a process selected from the group consisting of an additive patterning process and a subtractive patterning process.

17. A slider configured for energy-assisted magnetic recording, the slider comprising:
- a writer comprising an energy-assisted recording element, the writer configured to store information on a magnetic medium using the energy-assisted recording element, wherein the energy-assisted recording element comprises a spin torque oscillator (STO);
- a reader configured to read information stored on the magnetic medium;
- a head overcoat (HOC) layer providing an outermost media facing surface; and
- a protective cap positioned on the HOC layer to at least partially cover the reader wherein the protective cap covers an area smaller than an area of the outermost media facing surface.

18. The slider of claim 17, wherein the protective cap comprises diamond like carbon (DLC).

* * * * *